US009083793B2

(12) United States Patent
Lu et al.

(10) Patent No.: US 9,083,793 B2
(45) Date of Patent: Jul. 14, 2015

(54) METHOD AND APPARATUS FOR PROVIDING NETWORK BASED SERVICES TO PRIVATE BRANCH EXCHANGE ENDPOINTS

(75) Inventors: Min Lu, Freehold, NJ (US); Martin Dolly, Forked River, NJ (US); Leticia Johnson, Helotes, TX (US); Stephanie Parlamas, Colts Neck, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1643 days.

(21) Appl. No.: 12/275,919

(22) Filed: Nov. 21, 2008

(65) Prior Publication Data

US 2010/0128716 A1    May 27, 2010

(51) Int. Cl.
- H04L 29/06 (2006.01)
- H04M 3/42 (2006.01)
- H04M 7/12 (2006.01)

(52) U.S. Cl.
CPC ........ *H04M 3/42323* (2013.01); *H04L 65/1053* (2013.01); *H04M 3/42161* (2013.01); *H04M 7/123* (2013.01); *H04L 65/1016* (2013.01)

(58) Field of Classification Search
CPC ............ G01C 21/3453; H04L 65/1016; H04L 65/1053; H04L 29/06027; H04M 3/42161; H04M 3/42323; H04M 7/123; H04M 7/009
USPC .................. 370/352, 356, 328, 389
See application file for complete search history.

(56) References Cited

U.S. PATENT DOCUMENTS

| | | | |
|---|---|---|---|
| 6,996,087 B2 | 2/2006 | Ejzak | |
| 7,075,918 B1 * | 7/2006 | Kung et al. | 370/352 |
| 7,180,984 B1 * | 2/2007 | Samarasinghe | 379/88.13 |
| 7,787,447 B1 * | 8/2010 | Egan et al. | 370/389 |
| 7,805,161 B1 * | 9/2010 | Jones et al. | 455/555 |
| 2004/0252674 A1 * | 12/2004 | Soininen et al. | 370/352 |
| 2005/0083916 A1 | 4/2005 | Itagaki et al. | |
| 2006/0206504 A1 * | 9/2006 | Cai et al. | 707/100 |
| 2007/0050843 A1 * | 3/2007 | Manville et al. | 726/12 |
| 2007/0070976 A1 | 3/2007 | Mussman et al. | |
| 2007/0186250 A1 * | 8/2007 | Carey | 725/62 |
| 2007/0206571 A1 | 9/2007 | Silver | |
| 2007/0206580 A1 | 9/2007 | Silver et al. | |
| 2007/0206613 A1 | 9/2007 | Silver et al. | |
| 2007/0206735 A1 | 9/2007 | Silver et al. | |
| 2008/0194258 A1 * | 8/2008 | Chiu et al. | 455/435.1 |
| 2009/0003325 A1 * | 1/2009 | Lee et al. | 370/353 |
| 2009/0086740 A1 * | 4/2009 | Al-Bakri et al. | 370/401 |
| 2009/0262733 A1 * | 10/2009 | Olson | 370/389 |
| 2010/0009674 A1 * | 1/2010 | Sapkota et al. | 455/426.1 |
| 2010/0039987 A1 * | 2/2010 | Hegde et al. | 370/328 |
| 2010/0085937 A1 * | 4/2010 | Pressley et al. | 370/331 |
| 2010/0111079 A1 * | 5/2010 | Duffy et al. | 370/352 |
| 2010/0299442 A1 * | 11/2010 | van Elburg | 709/229 |

* cited by examiner

*Primary Examiner* — Khaled Kassim

(74) *Attorney, Agent, or Firm* — Hanley, Flight & Zimmerman, LLC (57) ABSTRACT

Many of the current IMS standards and enriched services were originally designed for the individual subscribers that are serviced by the wireless network. However, the IMS standards do not fully address the problem of providing the IMS enriched services and features to users connected to a PBX. The present invention discloses a method for providing IMS enriched services and features to users connected to a PBX or an IP-PBX. Access to network services can be secured through a web-friendly interface via the IMS, enabling third-party developers, service providers and even subscribers to self-manage their service experience while the network operator retains control over network resources.

21 Claims, 7 Drawing Sheets

METHOD AND APPARATUS FOR PROVIDING NETWORK BASED SERVICES TO PRIVATE BRANCH EXCHANGE ENDPOINTS

BACKGROUND

The IP Multimedia Subsystem (IMS) is an open and standardized architecture for converged fixed and mobile communications services. IMS enables service providers to expand their offerings to their customers by integrating voice and multimedia communications, such as video, text, images and instant messages, and delivering them into new environments. It is well known that IMS is emerging as a viable architecture that potentially may enable the convergence of various forms of communication, including voice and data, fixed and mobile services, public hot spot and enterprise WLAN, into an immersive system to provide the user with a seamless experience across various access networks.

A private branch exchange (PBX) is well known throughout the telecommunications industry. A PBX is a telephone exchange system that serves a particular business or office. A PBX connects the internal telephones of a private organization, usually a business, to the public switched telephone network (PSTN). The PSTN is a circuit switched network in which calls are assigned dedicated circuits during the duration of the call. Voice over Internet Protocol (VoIP) is a protocol optimized for the transmission of voice through the Internet or other packet-switched networks. An Internet Protocol PBX (IP-PBX) is a system designed to deliver voice over a data network and interoperate with the PSTN by combining VoIP gateways with traditional PBX functionality.

Many of the current IMS standards and enriched services were originally designed for the individual subscribers that are serviced by a wireless network such as a Wi-Fi or a cellular network. Although the IMS standards are expanding to support wireline services, including PBXs, these efforts only address the PBX as a single entity. IMS data network services are not available to many individual devices that are connected to the PBX. These PBX users are served by the PBX and not the IMS data network. Thus, the IMS standards do not fully address the problem of providing the IMS enriched services and features to individual users connected to a PBX.

What is needed is a method for providing IMS enriched services and features to users connected to a PBX or an IP-PBX.

SUMMARY

In one embodiment, data network services are provided to endpoints connected to a PBX. The PBX initiates a procedure to register the endpoint onto the data network by sending a registration message (on behalf of the endpoint) to the data network. A server receives the registration message, registers the endpoint with the data network and sends a confirmation message to the PBX, indicating that the endpoint is registered with the data network. This enables the data network to provide services to the registered endpoint via the PBX.

The registration procedure as described above enables the registered endpoint to receive data network services through alternative networks, such as the Wi-Fi or cellular networks. This enables the registered endpoint to physically roam away from the PBX without losing connectivity to the data network.

In another embodiment, the PBX is an IP-PBX which interoperates with an IMS/VoIP network. This enables the registered endpoint to receive IMS services such as video and mobile video gaming.

The PBX determines whether an endpoint that is connected to the PBX requires data network services. The PBX categorizes the endpoints into two groups, endpoints that do not require individual data network services and endpoints that require individual data network services.

In another embodiment, the PBX receives a call and determines how to route the call based on the categorization of the endpoints. If the call either originates from or terminates to an endpoint that requires individual data network services, then the PBX will route the call to the data network so that it may receive services from the data network.

In other embodiments, the PBX receives a call and determines various aspects of the originating and/or terminating endpoints. As discussed in further detail below, the PBX performs steps which involve determining, storing and replacing the identification number that is associated with the originating or terminating endpoint.

These and other advantages of the invention will be apparent to those of ordinary skill in the art by reference to the following detailed description and accompanying drawings.

DETAILED DESCRIPTION

Figure 1:
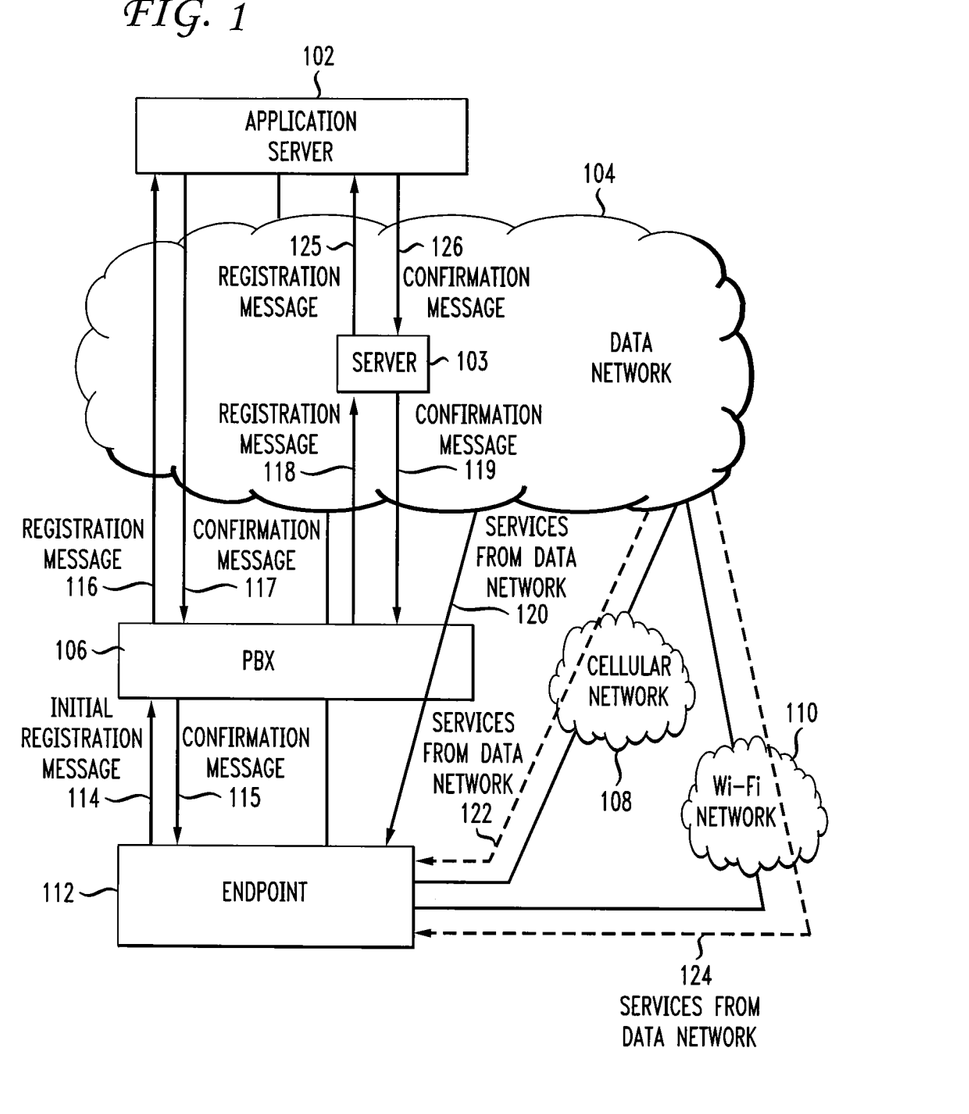
FIG. 1 is a high-level block diagram of a network in which an embodiment of the present invention may be implemented.
Figure 2:
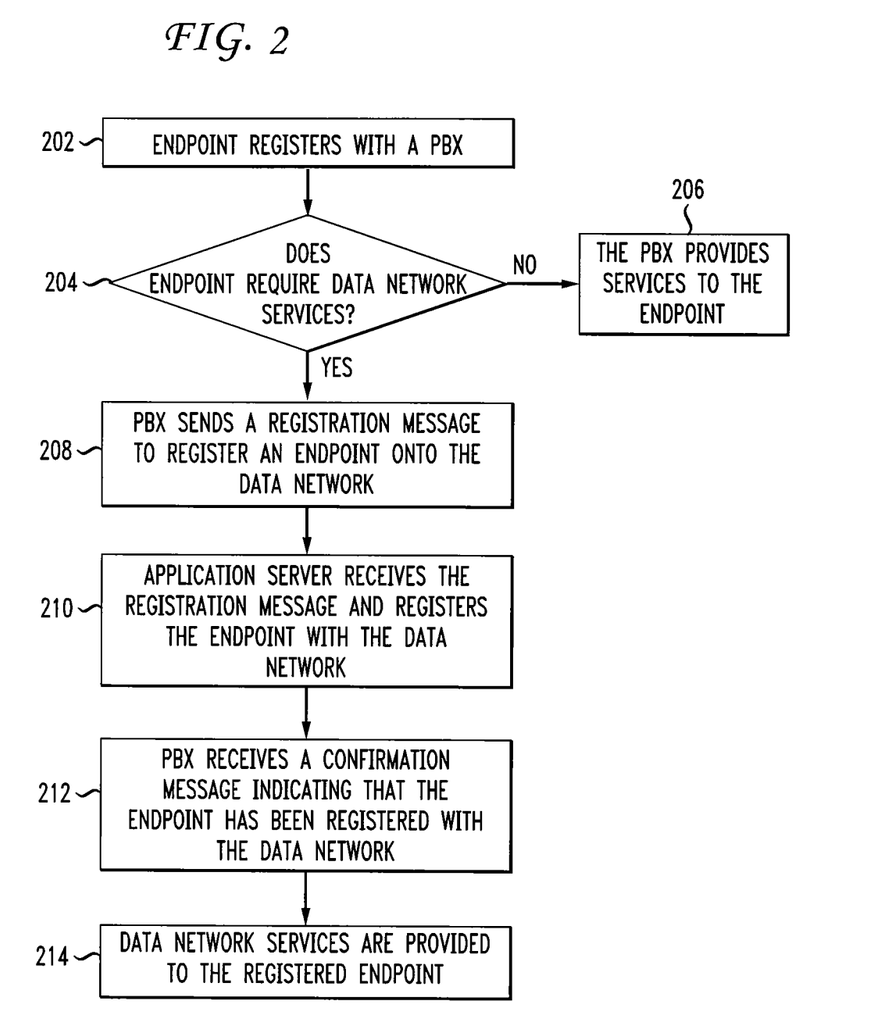
FIG. 2 is a flowchart showing the steps performed by the PBX in accordance with one embodiment of the present invention.

FIG. 1 is a high-level block diagram of a network in which an embodiment of the present invention may be implemented. FIG. 2 is a flowchart showing the steps performed in accordance with one embodiment of the present invention. FIGS. 1 and 2 are discussed concurrently to describe a method for registering an endpoint that is connected to a PBX onto a data network. An endpoint is any user device that is connected to a network. Endpoints can include, for example, personal computers (PCs), personal digital assistants (PDAs), cellular phones, landline telephones, and facsimile machines. A PBX is a telephone exchange system that serves a particular business or office. A data network is a packet-based Internet Protocol network that is capable of merging voice and data communication onto a single network. An example of a data network is an IMS/VoIP Core Network.

The endpoint 112 is connected to a PBX 106. The PBX 106 may be an IP-PBX. In step 202, the endpoint 112 sends an initial registration message 114 to the PBX 106. The initial registration message 114 is sent to the PBX 106 while the endpoint 112 boots up or when a registration timer, internal to the endpoint 112, expires. The PBX 106 receives the initial registration message 114 and registers the endpoint 112 onto the PBX 106. A confirmation message 115 is sent from the PBX 106 to the endpoint 112, confirming that the endpoint 112 has been registered onto the PBX 106. In step 204, the PBX 106 determines whether the endpoint 112 requires services from a data network 104. If no, then control passes to step 206 where the PBX 106 provides services to the endpoint 112. If yes, then control passes to step 208, in which the PBX 106, on behalf of the endpoint 112, sends a registration message 116 to an application server 102 via the data network 104. An application server is an entity that hosts and executes services for a data network. In step 210, the application server 102 receives the registration message 116 and registers the endpoint 112 onto the data network 104. An endpoint is registered onto a network when the endpoint is uniquely identified by the network, which enables communications between the endpoint and the network. In step 212, the application server 102 sends a confirmation message 117 to the PBX 106, indicating that the endpoint 112 has been registered onto the data network 104. The registration transaction for the registration message 116/confirmation message 117 pair may be independent from the registration transaction for the registration message 114/confirmation message 115 pair. The PBX 106 may also register the endpoint 112 onto the server 103 by sending a registration message 118 to the server 103 and by receiving a confirmation message 119 from server 103. The server 103 may be part of the data network 104. An example of the server 103 may be a Serving-Call Session control Function (S-CSCF). The PBX 106 may also register endpoint 112 with data network 104 via Server 103. During its registration processing, Server 103, would determine whether 3rd party registration to an application server should be performed. Assuming that Server 103 determines that 3rd party registration is required, Server 103 sends registration message 125 to application server 102, and a confirmation message 126 is sent from the application server 102 to server 103. In step 214 of FIG. 2, data network services 120 are provided from the data network 104 to the endpoint 112 via the PBX 106.

After the endpoint 112 is registered onto the data network 104 and the data network 104 provides services to the endpoint 112 via the PBX 106, the data network 104 may continue to provide services to the endpoint 112 in the event that the connection between the PBX 106 and the endpoint 112 is severed. If the endpoint 112 is capable of transmitting and receiving signals to and from a cellular network 108, then data network services 122 may be provided from the data network 104 to the endpoint 112 via the cellular network 108. Also, if the endpoint 112 is capable of transmitting and receiving signals to and from a Wi-Fi network 110, then data network services 124 may be provided from the data network 104 to the endpoint 112 via the Wi-Fi network 110. A cellular network is a radio network made up of a network of radio transmitters and receivers to provide radio coverage over a wider area than the area of one radio transmitter and receiver. An example of a cellular network includes CDMA, GSM, and 3G. Wi-Fi is a wireless technology that is used by electronic devices that require wireless networking capability. Wi-Fi covers various IEEE 802.11 technologies, including 802.11n, 802.11b, 802.11g and 802.11a.

Thus, if the endpoint 112 is capable of communicating with the cellular network 108 or with the Wi-Fi network 110, the endpoint 112 may physically roam away from PBX 106 while continuing to receive services from data network 104. For example, if endpoint 112 is connected to PBX 106 via a private corporate Wi-Fi connection, and endpoint 112 roams far enough away from PBX 106 such that the private corporate Wi-Fi connection is disconnected, the data network 104 may still provide services to endpoint 112 via a cellular network 108 or via a different Wi-Fi network 110. Wi-Fi network 110 may be a public Wi-Fi network or a different private Wi-Fi network.

In one embodiment, the Wi-Fi network 110 may enable the connection from the PBX 106 to the endpoint 112. In this example, the Wi-Fi network 110 may be a corporate campus in which is part of the PBX 106. Here, the Wi-Fi network 110 provides the connection from the endpoint 112 to the PBX 106. Accordingly, the endpoint 112 is capable of communicating through a Wi-Fi network. Thus, if the endpoint 112 roams away from the PBX 106, the endpoint 112 may continue to receive the data services 120 from the data network 104 via a different Wi-Fi network.

Figure 3:
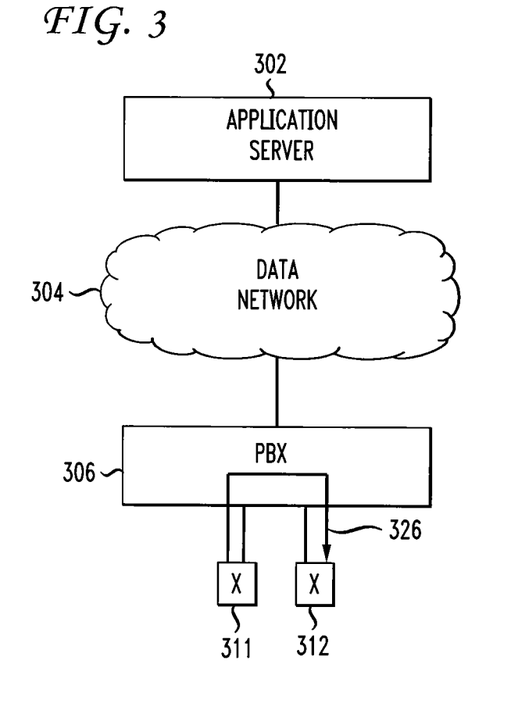
FIG. 3 is a network diagram illustrating intra-PBX call routing methods in a network in which an embodiment of the present invention may be implemented.

FIG. 3 is a high-level network diagram showing a call route 326 for an intra-PBX call where the originating and terminating endpoints do not require individual data network services. The network as shown includes an Application Server 302, Data Network 304, PBX 306 and group X endpoints 311 and 312. Group X endpoints do not require individual data network services. The group X endpoints 311 and 312 may be Session Initiation Protocol (SIP) phones. SIP is a standard protocol for Voice over IP (VoIP). A SIP phone enables calls to other devices using the Internet to carry the call.

Referring to FIG. 3, the PBX 306 determines the routing of a call that originates from and terminates to their respective endpoints, based on the categorization of the endpoints. The call route 326 originates from the group X endpoint 311 and terminates at the group X endpoint 312. Because the group X endpoints 311 and 312 do not require individual data network services, the PBX 306 does not route the call 326 through the application server 302. Instead, the call 326 is routed within the PBX 306. Such a call will not be routed outside of the PBX 306. Services for the call route 326 are provided by the PBX 306.

Figure 4:
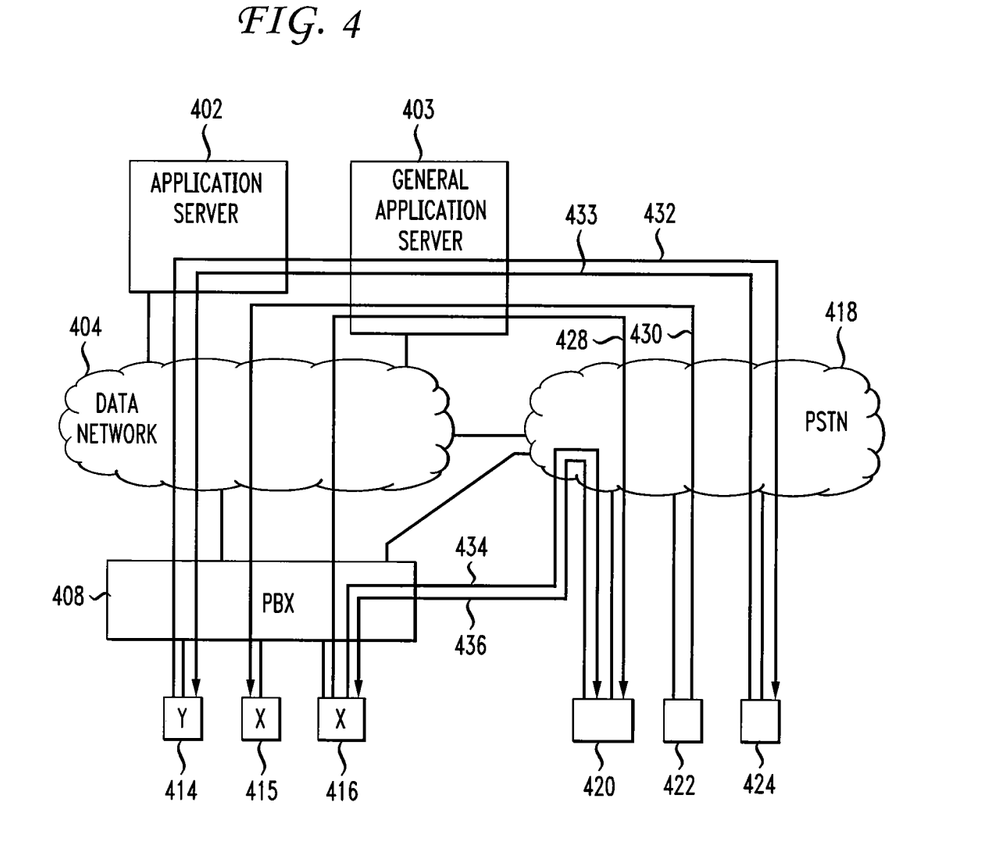
FIG. 4 is a network diagram illustrating call routing methods in a network in which an embodiment of the present invention may be implemented.

FIG. 4 is a high-level network diagram showing call routes 428, 430, 432, 434 and 436. These calls may be routed via data network 404 or may be routed while bypassing the data network 404. The network as shown in FIG. 4 includes an application server 402, a general application server 403, a data network 404, a PBX 408, a group Y endpoint 414, group X endpoints 415 and 416, the PSTN 418, and devices 420, 422 and 424. Endpoints that are connected to the PBX may be categorized into two groups—group X endpoints and group Y endpoints. Group X endpoints do not require individual data network services. Group Y endpoints require individual data network services. The group Y endpoint 414 is registered with the application server 402 via the data network. The application server 402 will provide core network services to the group Y endpoint 414. The general application server 403 does not provide core network services to the endpoints, but may provide other services, such as VoIP services, to the PBX as a group. The devices 420, 422 and 424 may be traditional telephones that are connected to the PSTN 418. The call route 428, which originates from the group X endpoint 416 to a destination outside of the PBX 408, such as the device 420, may be routed through the data network 404. Because the endpoint 416 is categorized as a group X endpoint, i.e. it does not require individual data network services, the PBX 408 does not route the call route 428 through the application server 402, thus the data network 404 does not provide individual data network services or treatment to the group X endpoint 416. However, the call route 428 may be routed from the PBX 408 through the data network 404 and through the general application server 403, then through the PSTN 418, finally terminating at device 420. This enables the general application server 403 to provide other data services to the PBX 408. Similarly, call route 430, which originates from the device 422 and terminates to the group X endpoint 415, is not routed by the PBX 408 through the application server 402, but may be routed through the general application server 403. The general application server 403 may be part of the data network 404, as shown in FIG. 4, or it may be connected to, but outside of data network 404. The data network 404 does not provide core network services or treatment to the group X endpoint 415 for call route 430.

The call route 432, as shown in FIG. 4, originates from the group Y endpoint 414 and terminates to a device outside of the PBX 406, such as to the device 424. The PBX 408 determines that the group Y endpoint 414 requires individual data network services and therefore routes the call through the application server 402 so that the group Y endpoint 414 may receive originating service processing from the data network 404. The call route 433, as shown in FIG. 4, originates from a device outside of the PBX 406, such as to the device 424, and terminates to the group Y endpoint 414. The PBX 408 determines that the group Y endpoint 414 requires individual data network services and therefore routes the call through the application server 402 so that the group Y endpoint 414 may receive originating service processing from the data network 404. Call routes 432 and 433 are routed through the general application server 403 since it provides general services for PBX 408.

In one embodiment, the PBX 408 determines if a call shall be routed through the data network 404. For calls that are originated behind the PBX 408 that do not require core services from the data network 404, the PBX 404 may route the call to the PSTN 418 while bypassing the data network 404. As an example, the call route 434, which originates from the group X endpoint and terminates at device 420, is routed by the PBX 408 through the PSTN 418 while bypassing the data network 404. Similarly, the call route 436, which originates from the device 420, is routed by the PBX 408 from the PSTN 418 to the endpoint 416 while bypassing the data network 404.

Figure 5:
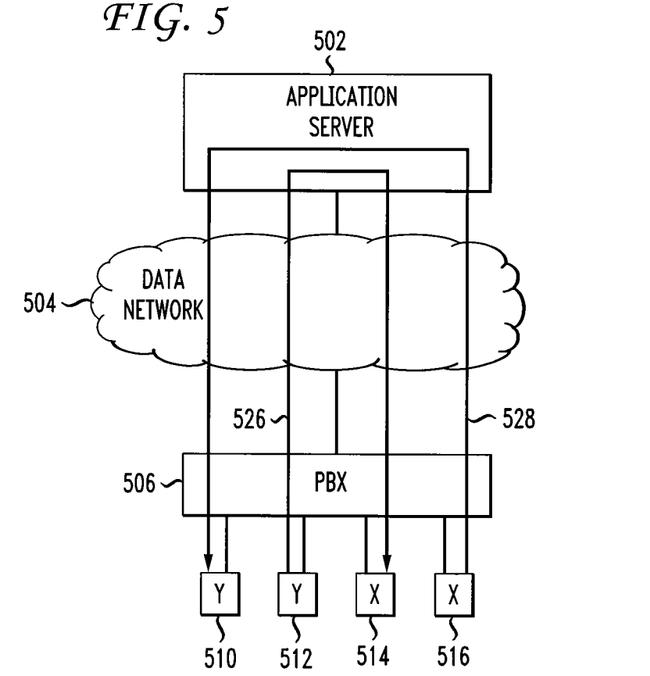
FIG. 5 is a network diagram illustrating call routing methods in a network in which an embodiment of the present invention may be implemented.

FIG. 5 illustrates the routing of Intra-PBX call routes 526 and 528. The call route 526 originates at the group Y endpoint 512 and terminates at the group X endpoint 514. When the call is routed from the group Y endpoint 512 to the PBX 506, the PBX 506 realizes that this call was originated from the Group Y endpoint 512 and that it requires core network services. Because the PBX 506 initiated the steps as described above to register the group Y endpoint 512 onto the data network 504, the data network 504 may provide origination services to the group Y endpoint 512. The PBX 506 determines if the called party, the group X endpoint 514, is identified by a PBX extension number and whether it has an associated E.164 number or network recognizable Session Initiation Protocol Uniform Resource Identifier (SIP URI). E.164 is an internationally recognized standard which defines the international public telecommunication numbering plan used in the PSTN and some other data networks. It defines the format of telephone numbers. E.164 numbers can have a maximum of fifteen digits and are usually written with a + prefix. SIP URI is an addressing format used to communicate with another device, e.g., the user's SIP phone number.

If, in FIG. 5, the group X endpoint 514 is identified by a PBX extension number and has an associated E.164 number or network recognizable SIP URI, the PBX 506 replaces the Request-URI (R-URI) with either a SIP URI representation of the full E.164 number or the SIP URI of the destination. A Request-URI identifies an Internet location by the path and/or query parameters. If the called party, the group X endpoint 514, does not have an associated E.164 number or a network recognizable SIP URI, the PBX 506 may replace the R-URI, e.g., destination number, with a temporary routing number so that the call can be routed back to the PBX 506. The original dialed number may be stored by the PBX 506 in its cache memory. The PBX 506 then may forward the call to the data network 504. Since a SIP URI representation of the full E.164 number or network recognizable SIP URI or the temporary routing number is either a PBX number or a SIP URI, the call routes to the PBX 506. If the temporary routing number is received, the PBX 506 may replace the R-URI with the original dialed number that was stored by the PBX 506 in its cache memory and the call is routed to the appropriate group X endpoint 514. If a SIP URI representation of the E.164 number or network recognizable SIP URI is received, the call may route to the group X endpoint 514 without further processing from the data network 504.

FIG. 5 also illustrates the routing of the Intra-PBX call route 528, originating at the group X endpoint 516 and terminating at the group Y endpoint 510. When call route 528 is routed from the group X endpoint 516 to the PBX 508, the PBX 508 realizes that the call route 528 is terminating at the group Y endpoint 510 and that the group Y 510 endpoint requires data network services. Because the PBX 506 initiated the steps as described above to register the group Y endpoint 510 onto the data network 504, the group Y endpoint 510 may receive services from the data network 504. The PBX 506 determines if the called party, in this case the group Y endpoint 510, is identified by a private dialed number, e.g., an extension number. If the group Y endpoint 510 is identified by a private dialed number, the PBX 506 replaces the R-URI with either a SIP URI representation of a full E.164 or a network recognizable SIP URI associated with the group Y endpoint 510. The PBX 506 then may forward the call to the data network 504. The data network 504 performs the necessary originating and terminating service and routes the call to the destination at the PBX 506. The PBX 506 routes the call to the destination group Y endpoint 510.

Figure 6:
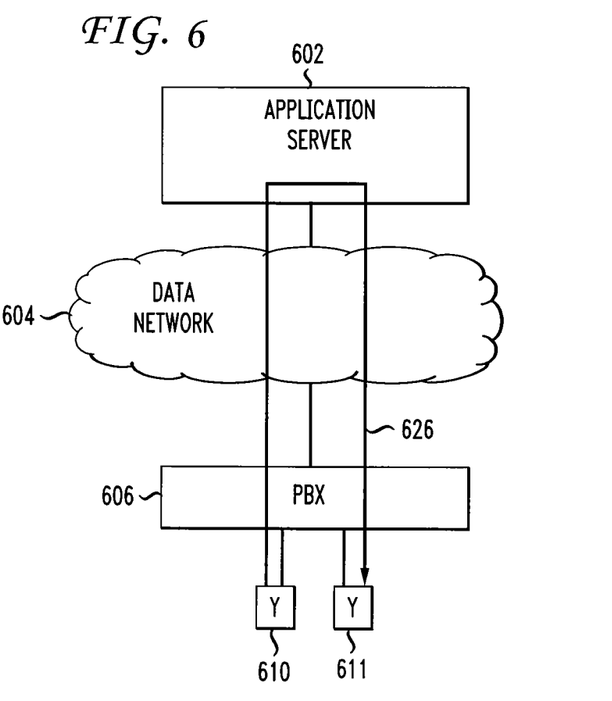
FIG. 6 is a network diagram illustrating a call routing method in a network in which an embodiment of the present invention may be implemented.

FIG. 6 shows the routing of the intra-PBX call route 626, originating at the group Y endpoint 610 and terminating at the group Y endpoint 611. When the call is routed from the group Y endpoint 610 to the PBX 606, the PBX 606 realizes that this call is originating from and terminating to the group Y endpoints in which both requires data network services. Because the PBX 606 initiated the steps as described above to register the group Y endpoints 610 and 611 onto the data network 604, the group Y endpoints 610 and 611 may receive services from the data network 604. The PBX 606 determines if the called party at the group Y endpoint 611 is identified by a private dialed number, e.g., an extension number. If the called party at the group Y endpoint 611 is a private dialed number, the PBX 606 replaces the From/P-Preferred-Identity header and the R-URI with a SIP URI representation of a full E.164 or network recognizable SIP URI associated with the originating group Y endpoint 610 and the terminating group Y endpoint 611. The PBX 606 then may forward the call to the data network 604. The data network 604 performs the necessary originating and terminating service on call route 626.

Figure 7:
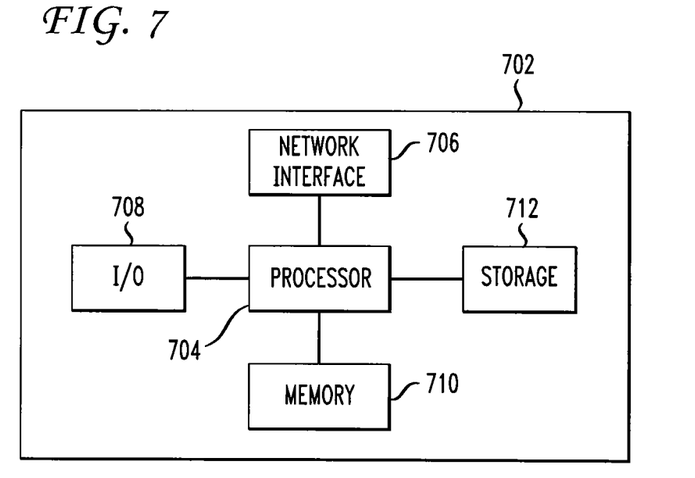
FIG. 7 is a high level block diagram of a computer.

The above-described methods and network elements may be implemented using a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.), and loaded into memory 710 when execution of the computer program instructions is desired. Thus, the steps of FIGS. 1-6 can be defined by the computer program instructions stored in the memory 710 and/or storage 712 and controlled by the processor 704 executing the computer program instructions. For example, the computer program instructions can be implemented as computer executable code programmed by one skilled in the art to perform an algorithm defined by the steps of FIGS. 1-6. Accordingly, by executing the computer program instructions, the processor 704 executes an algorithm defined by the steps of FIGS. 1-6. The computer 702 also includes one or more network interfaces 706 for communicating with other devices via a network. The computer 702 also includes other input/output devices 708 that enable user interaction with the computer 702. One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing services from a data network to a first endpoint connected to a private branch exchange, comprising:

receiving a registration message identifying the first endpoint from the private branch exchange, the first endpoint previously registered with the private branch exchange;

registering the first endpoint with the data network to enable the first endpoint to receive data network services from the data network;

receiving, at the private branch exchange, a call and a called party number associated with the call from the first endpoint;

determining whether a second endpoint associated with the called party number has an E.164 number;

in response to determining that the second endpoint associated with the called party number has an E.164 number:

replacing, at the private branch exchange, a request-uniform resource identifier of the call with a session initiation protocol uniform resource identifier representation of the E.164 number; and routing the call to the data network;

determining whether the second endpoint associated with the called party number has one of an E.164 number and a network recognizable session initiation protocol uniform resource identifier; and if the first endpoint is connected to the private branch exchange and requires data network services and the second endpoint is connected to the private branch exchange, and if the second endpoint associated with the called party number does not have one of an E.164 number and a network recognizable session initiation protocol uniform resource identifier:

replacing the request-uniform resource identifier with a temporary routing number;

storing a dialed number associated with the request-uniform resource identifier in cache memory; and replacing the request-uniform resource identifier with the stored dialed number.

2. The method of claim 1, wherein the private branch exchange comprises an internet protocol private branch exchange.

3. The method of claim 2, wherein the data network is an internet protocol multimedia subsystem voice over internet protocol network.

4. The method of claim 1, further comprising providing the data network services to the first endpoint via the private branch exchange.

5. The method of claim 1, wherein the data network services are provided to the first endpoint via a cellular network.

6. The method of claim 1, wherein the data network services are provided to the first endpoint via a Wi-Fi network.

7. A method for providing services from a data network to a first endpoint connected to a private branch exchange, comprising:

transmitting a registration message from the private branch exchange identifying the first endpoint to the data network, the first endpoint previously registered with the private branch exchange;

receiving a confirmation message indicating that the first endpoint has been registered with the data network so that data network services may be provided to the first endpoint registered with the data network;

receiving, at the private branch exchange, a call and a called party number associated with the call from the first endpoint;

determining whether a second endpoint associated with the called party number has an E.164 number;

in response to determining that the second endpoint associated with the called party number has an E.164 number:

replacing, at the private branch exchange, a request-uniform resource identifier with a session initiation protocol uniform resource identifier of the second endpoint; and routing the call to the data network;

determining whether the second endpoint associated with the called party number has one of an E.164 number and a network recognizable session initiation protocol uniform resource identifier; and if the first endpoint is connected to the private branch exchange and requires data network services and the second endpoint is connected to the private branch exchange, and if the second endpoint associated with the called party number does not have one of an E.164 number and a network recognizable session initiation protocol uniform resource identifier:

replacing the request-uniform resource identifier with a temporary routing number;

storing a dialed number associated with the request-uniform resource identifier in cache memory; and replacing the request-uniform resource identifier with the stored dialed number.

8. The method of claim 7, wherein the private branch exchange comprises an internet protocol private branch exchange.

9. The method of claim 8, wherein the data network is an internet protocol multimedia subsystem voice over internet protocol network.

10. The method of claim 7, further comprising:
   determining if the one of the first endpoint and the second endpoint requires data network services of the data network; and
   routing the call to the data network when the one of the first endpoint and the second endpoint requires the data network services.

11. The method of claim 7, further comprising:
   determining whether the first and second endpoints are connected to the private branch exchange;
   determining whether both the first and second endpoints require data network services of the data network;
   if (1) the first and second endpoints are connected to the private branch exchange, (2) both the first and second endpoints require the data network services, and (3) if one of a private dialing number and an extension number is used by the call:
      replacing a From/P-Preferred-Identity header and the request-uniform resource identifier with one of a session initiation protocol uniform resource identifier representation of a full E.164 and a network recognizable session initiation protocol uniform resource identifier;
      forwarding the call to the data network; and
      routing the call to the second endpoint.

12. An apparatus for providing services from a data network to first endpoint connected to a private branch exchange, the apparatus comprising:
   a processor; and
   memory comprising instructions which, when executed, cause the processor to perform operations comprising:
      receiving a registration message identifying the first endpoint from the private branch exchange, the first endpoint previously registered with the private branch exchange;
      registering the first endpoint with the data network to enable the first endpoint to receive data network services from the data network;
      receiving, from the first endpoint, a call and a called party number associated with the call;
      determining whether a second endpoint associated with the called party number has an E.164 number;
      in response to determining that the second endpoint associated with the called party number has an E.164 number:
         replacing, at the private branch exchange, a request-uniform resource identifier with a session initiation protocol uniform resource identifier representation of the E.164 number; and
         routing the call to the data network;
      determining whether the second endpoint associated with the called party number has one of an E.164 number and a network recognizable session initiation protocol uniform resource identifier; and
      if the first endpoint is connected to the private branch exchange and requires data network services and the second endpoint is connected to the private branch exchange, and if the second endpoint associated with the called party number does not have one of an E.164 number and a network recognizable session initiation protocol uniform resource identifier:
         replacing the request-uniform resource identifier with a temporary routing number;
         storing a dialed number associated with the request-uniform resource identifier in cache memory; and
         replacing the request-uniform resource identifier with the stored dialed number.

13. The apparatus of claim 12, wherein the operations further comprise providing the data network services to the first endpoint via the private branch exchange.

14. An apparatus for providing services from a data network to a first endpoint connected to a private branch exchange, the apparatus comprising:
   a processor; and
   memory comprising instructions which, when executed, cause the processor to perform operations comprising:
      transmitting a registration message from the private branch exchange identifying the first endpoint to the data network, the first endpoint previously registered with the private branch exchange;
      receiving a confirmation message indicating that the first endpoint has been registered with the data network so that data network services may be provided to the first endpoint registered with the data network;
      receiving, from the first endpoint, a call and a called party number associated with the call;
      determining whether a second endpoint associated with the called party number has an E.164 number;
      in response to determining that the second endpoint associated with the called party number has an E.164 number:
         replacing, at the private branch exchange, a request-uniform resource identifier with a session initiation protocol uniform resource identifier of the second endpoint in response to determining that the second endpoint associated with the called party number has an E.164 number; and
         routing the call to the data network;
      determining whether the second endpoint associated with the called party number has one of an E.164 number and a network recognizable session initiation protocol uniform resource identifier; and
      if the first endpoint is connected to the private branch exchange and requires data network services and the second endpoint is connected to the private branch exchange, and if the second endpoint associated with the called party number does not have one of an E.164 number and a network recognizable session initiation protocol uniform resource identifier:
         replacing the request-uniform resource identifier with a temporary routing number;
         storing a dialed number associated with the request-uniform resource identifier in cache memory; and
         replacing the request-uniform resource identifier with the stored dialed number.

15. The apparatus of claim 14, wherein the operations further comprise:
   determining if the one of the first and second endpoints requires data network services; and
   routing the call to the data network if one of the first and second endpoints requires the data network services.

16. The apparatus of claim 14, wherein the operations further comprise:
   determining whether the first and second endpoints are connected to the private branch exchange;
   determining whether both the first and second endpoints require data network services;
   if the first and second endpoints are connected to the private branch exchange, both the first and second endpoints require the data network services, and at least one of a private dialing number and an extension number is used by the call:
    replacing a From/P-Preferred-Identity header and the request-uniform resource identifier with one of a session initiation protocol uniform resource identifier representation of a full E.164 and a network recognizable session initiation protocol uniform resource identifier;
    forwarding the call to the data network; and
    routing the call to the second endpoint.

17. A tangible computer readable storage device comprising machine readable instructions that, when executed, cause a private branch exchange to perform operations comprising:
    receiving a registration message identifying a first endpoint from the private branch exchange, the first endpoint previously registered with the private branch exchange;
    registering the first endpoint with a data network to enable the first endpoint to receive data network services from the data network;
    in response to receiving, from the first endpoint, a call and a called party number associated with the call, determining whether a second endpoint associated with the called party number has an E.164 number;
    in response to determining that the second endpoint associated with the called party number has an E.164 number:
        replacing a request-uniform resource identifier of the call with a session initiation protocol uniform resource identifier representation of the E.164 number; and
        routing the call to the data network;
    determining whether the second endpoint associated with the called party number has one of an E.164 number and a network recognizable session initiation protocol uniform resource identifier; and
    if the first endpoint is connected to the private branch exchange and requires data network services and the second endpoint is connected to the private branch exchange, and if the second endpoint associated with the called party number does not have one of an E.164 number and a network recognizable session initiation protocol uniform resource identifier:
        replacing the request-uniform resource identifier with a temporary routing number;
        storing a dialed number associated with the request-uniform resource identifier in cache memory; and
        replacing the request-uniform resource identifier with the stored dialed number.

18. The computer readable storage device of claim 17, wherein the operations further comprise providing the data network services to the first endpoint.

19. A tangible computer readable storage device comprising instructions that, when executed, cause a private branch exchange to perform operations comprising:
    transmitting a registration message identifying a first endpoint to a data network to register the first endpoint, the first endpoint previously registered with the private branch exchange; receiving a confirmation message indicating that the first endpoint has been registered with the data network so that data network services may be provided to the first endpoint registered with the data network;
    in response to receiving, from the first endpoint, a call and a called party number associated with the call, determining whether a second endpoint associated with the called party number has an E.164 number;
    in response to determining that the second endpoint associated with the called party number has an E.164 number:
        replacing a request-uniform resource identifier with a session initiation protocol uniform resource identifier of the second endpoint; and
        routing the call to the data network;
    determining whether the second endpoint associated with the called party number has one of an E.164 number and a network recognizable session initiation protocol uniform resource identifier; and
    if the first endpoint is connected to the private branch exchange and requires data network services and the second endpoint is connected to the private branch exchange, and if the second endpoint associated with the called party number does not have one of an E.164 number and a network recognizable session initiation protocol uniform resource identifier:
        replacing the request-uniform resource identifier with a temporary routing number;
        storing a dialed number associated with the request-uniform resource identifier in cache memory; and
        replacing the request-uniform resource identifier with the stored dialed number.

20. The computer readable storage device of claim 19, wherein the operations further comprise:
    determining if the one of the first endpoint and the second endpoint requires data network services of the data network; and
    routing the call to the data network when one of the first endpoint and the second endpoint requires the data network services.

21. The computer readable storage device of claim 19, the operations further comprising:
    determining whether the first and second endpoints are connected to the private branch exchange;
    determining whether both the first and second endpoints require data network services of the data network; and
    if (1) the first and second endpoints are connected to the private branch exchange, (2) both the first and second endpoints require the data network services, and (3) a private dialing number is used by the call:
        replacing a From/P-Preferred-Identity header and the request-uniform resource identifier with one of a session initiation protocol uniform resource identifier representation of a E.164 and a network recognizable session initiation protocol uniform resource identifier;
        forwarding the call to the data network; and
        routing the call to the second endpoint.

\* \* \* \* \*